M. H. ALBERGER.
Insulated Telegraph Wire.

No. 201,477.                     Patented March 19, 1878.

United States Patent Office.

MORRIS H. ALBERGER, OF PHILADELPHIA, PENNSYLVANIA, ASSIGNOR OF ONE-HALF HIS RIGHT TO SILAS W. PETTIT, OF SAME PLACE.

IMPROVEMENT IN INSULATED TELEGRAPH-WIRES.

Specification forming part of Letters Patent No. 201,477, dated March 19, 1878; application filed February 23, 1878.

*To all whom it may concern:*

Be it known that I, MORRIS H. ALBERGER, of Philadelphia, Pennsylvania, have invented a new and useful Improvement in Wires and Bars and in the Mode of Making the Same, of which the following is a specification:

The object of my invention is to so combine a wrought-iron tube with a copper or other wire or wires and intervening vitreous substance, and to so treat the compound bar by stretching, rolling or drawing, that it can be reduced to the condition of a comparatively small, flexible, and perfectly insulated and strong telegraph-wire.

Figures 1, 4:
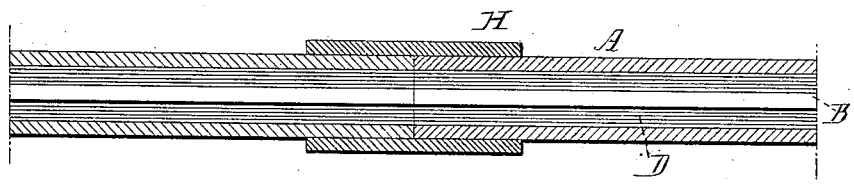

In Figure 1, A represents an exterior tube of wrought-iron—a butt or lap welded tube; B, a wire of copper or other metal or alloy, which is a good electrical conductor; and D, an intervening tube of glass or other vitreous substance which will melt when subjected to heat.

The glass may be introduced, in the condition of a tube or in a powdered condition, into the annular space between the wire and iron tube, and the whole subjected to sufficient heat to melt the glass, so that there may be a comparatively close union of the three elements; or the iron tube may be first lined with glass, and the wire afterward passed through the vitreous lining.

The further treatment of the compound bar thus produced is based on a discovery I have made, that a tube of iron with a wire of copper, and intervening tube of glass can, when heated, be reduced in diameter by forging, rolling, stretching, or drawing, without disturbing the relation of the parts to each other, there being a general reduction, and the wire being as effectually insulated by the glass as in the original compound bar. Thus, if a tube, D, of glass be loosely introduced into a short tube, A, of iron, and a copper wire of the same length be inserted into the tube of glass, and the bar thus made up be subjected to a red heat, it may be reduced by forging, rolling, stretching, or drawing, in the same manner as a solid bar of metal.

Reduction by forging would, of course, be out of the question, owing to the expense, although a preliminary forging might be advisable in many cases preparatory to subjecting it to any of the other processes.

The compound bar may be heated in a furnace and there stretched while in a heated condition; or it may be rolled in the same manner as an ordinary iron bar; or it may be reduced by drawing it through dies in the manner now practiced in drawing Bessemer-steel wire.

Figure 2:
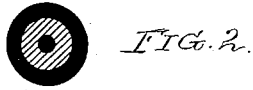
Figure 3:
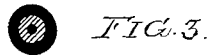

After reduction the copper wire will be as perfectly insulated as in the original compound bar. (See Figs. 2, 3, and 4.)

Figure 5:
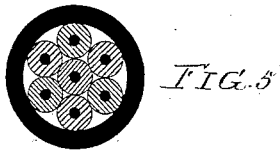

If the iron tube has to contain a group of wires, each wire must be inclosed in a separate tube of glass, as shown in Fig. 5, and these tubes must be contained within one iron tube.

Figure 6:

The result of the reduction of this compound bar will be the embedding of the wires in glass and their isolation from each other, as shown in Fig. 6.

In laying the compound telegraph-wires, I fit the adjoining ends of two lengths into a thimble, H, Fig. 1, force the two ends together by any suitable appliances, then subject the joint to a welding-heat, and compress the thimble by a pair of ordinary pipe-tongs or otherwise, thereby effecting at the same time a perfect union of the outer tubes, copper wires, and intervening insulating material.

I claim as my invention—

The mode herein described of making telegraph-wires—that is to say, the reducing of a compound bar, consisting of an iron tube, wire core, and intervening vitreous substance, by subjecting it to heat and then reducing it by stretching, rolling, or drawing, as set forth.

In testimony whereof I have signed my name to this specification in the presence of two subscribing witnesses.

MORRIS H. ALBERGER.

Witnesses:
HARRY A. CRAWFORD,
HARRY SMITH.